United States Patent
Rieger et al.

(10) Patent No.: US 8,744,680 B2
(45) Date of Patent: Jun. 3, 2014

(54) METHOD FOR DETERMINING A MOVEMENT OF A VEHICLE BODY

(75) Inventors: Karl-Josef Rieger, Rottenburg am Neckar (DE); Thomas Schirle, Oehringen (DE)

(73) Assignee: Daimler AG, Stuttgart (DE)

( * ) Notice: Subject to any disclaimer, the term of this patent is extended or adjusted under 35 U.S.C. 154(b) by 0 days.

(21) Appl. No.: 13/579,958

(22) PCT Filed: Mar. 4, 2011

(86) PCT No.: PCT/EP2011/001067
§ 371 (c)(1),
(2), (4) Date: Aug. 20, 2012

(87) PCT Pub. No.: WO2011/110312
PCT Pub. Date: Sep. 15, 2011

(65) Prior Publication Data
US 2012/0323444 A1    Dec. 20, 2012

(30) Foreign Application Priority Data
Mar. 11, 2010   (DE) .......................... 10 2010 011 093

(51) Int. Cl.
*G06F 19/00*   (2011.01)
*G01C 21/36*   (2006.01)

(52) U.S. Cl.
CPC ... *G01C 21/3602* (2013.01); *G06T 2207/10028* (2013.01); *G06T 2207/30252* (2013.01); *G06T 2207/20221* (2013.01)
USPC ............... 701/37; 701/65; 701/117; 701/119; 701/523; 382/100; 382/103; 382/106; 235/385

(58) Field of Classification Search
CPC ........... G06T 2207/30252; G06T 2207/10028; G06T 2207/20101; G06T 2207/20221; G01C 21/3602
USPC .............. 701/28, 293.1, 36, 37, 65, 117, 119, 701/523; 340/433, 435, 436, 461, 815.69, 340/901, 903, 936, 937; 348/118, 119, 143, 348/148, 149, 169; 180/104, 167, 197, 271; 396/427; 318/587; 280/5.5; 382/100, 382/103, 106; 325/385
See application file for complete search history.

(56) References Cited

U.S. PATENT DOCUMENTS 6,915,228 B2 *   7/2005   Uffenkamp et al. ............ 702/94
7,365,831 B2 *   4/2008   Braeunl et al. ............... 356/4.01
(Continued)

FOREIGN PATENT DOCUMENTS

DE   102008031947 A1   10/2009
JP       10175561 A    6/1998
(Continued)

OTHER PUBLICATIONS

Office Action issued Jan. 22, 2014, in Japanese Patent Application No. 2012-556408 (with English-language translation).

*Primary Examiner* — McDieunel Marc
(74) *Attorney, Agent, or Firm* — Patent Central LLC; Stephan A. Pendorf

(57) ABSTRACT

A method for determining a vehicle body movement of a vehicle body of a vehicle (1) using a camera (3) arranged on the vehicle (1). Camera images of vehicle surroundings are thereby continuously recorded using the camera (3) and image position data of at least one static object (8) are determined by a processor in camera images recorded at different times. Using the time-based sequence of the determined image position data the vehicle body movement is determined by the processor. Further, a method for determining a spring compression movement of at least one wheel (7), mounted in a sprung fashion, of a vehicle (1) which comprises a camera (3) arranged on the vehicle (1).

5 Claims, 1 Drawing Sheet

(56) References Cited

U.S. PATENT DOCUMENTS

| | | | |
|---|---|---|---|
| 8,121,350 B2* | 2/2012 | Klefenz | 382/104 |
| 8,483,442 B2* | 7/2013 | Takiguchi et al. | 382/106 |
| 8,571,265 B2* | 10/2013 | Takiguchi et al. | 382/106 |
| 8,625,851 B2* | 1/2014 | Takiguchi et al. | 382/103 |
| 2005/0102083 A1 | 5/2005 | Xu et al. | |
| 2007/0095588 A1 | 5/2007 | Mattes et al. | |
| 2007/0165908 A1* | 7/2007 | Braeunl et al. | 382/104 |
| 2009/0079145 A1 | 3/2009 | Inoue et al. | |
| 2010/0034426 A1* | 2/2010 | Takiguchi et al. | 382/106 |
| 2010/0042292 A1 | 2/2010 | Schindler et al. | |
| 2010/0086174 A1* | 4/2010 | Kmiecik et al. | 382/103 |

FOREIGN PATENT DOCUMENTS

| | | |
|---|---|---|
| JP | 2005178531 A | 7/2005 |
| JP | 2006298007 A | 11/2006 |
| JP | 2009298344 A | 12/2009 |
| JP | 2010501387 A | 1/2010 |
| WO | 2004041611 A1 | 5/2004 |
| WO | 2008022696 A1 | 2/2008 |
| WO | 2008022697 A1 | 2/2008 |
| WO | 2008022698 A1 | 2/2008 |

* cited by examiner

METHOD FOR DETERMINING A MOVEMENT OF A VEHICLE BODY

BACKGROUND OF THE INVENTION

1. Field of the Invention

The invention relates to a method for determining a movement of a vehicle body of a vehicle and for determining a spring compression movement of at least one wheel, mounted in a sprung fashion, of a motor vehicle.

2. Description of the Related Art

Many modern vehicles have vehicle functions which are controlled by an evaluation of a vehicle body movement or a spring compression movement of wheels of the vehicle. Such vehicle functions are for example a damper regulation for shock absorbers or a light width regulation for headlamps of the vehicle. The vehicle body movement and the spring compression movement are thereby determined as a rule by means of spring path sensors which are arranged on wheels or wheel axles of the vehicle.

US 2005/0102083 A1 discloses a roll stability control system for a vehicle which comprises a surroundings sensor system and a control unit coupled thereto. The control unit produces dynamic vehicle-characteristic control signals in dependence upon signals of the surroundings sensor system and controls a roll-over control system.

It is the object of the invention to indicate improved methods for determining a vehicle body movement of a vehicle body or for determining a spring compression movement of at least one wheel, mounted in a sprung fashion, of a vehicle.

BRIEF SUMMARY OF THE INVENTION

The object is achieved according to the invention having regard to the determination of a vehicle body movement through a method using a camera (3) arranged on the vehicle (1). Camera images of vehicle surroundings are continuously recorded using the camera (3) and image position data of at least one static object (8) are determined by a processor in camera imam recorded at different times. Using the time-based sequence of the determined image position data the vehicle body movement is determined by the processor. Further, a method for determining a spring compression movement of at least one wheel (7), mounted in a sprung fashion, of a vehicle (1) is achieved using a camera (3) arranged on the vehicle (1), without requiring conventional spring sensors.

Advantageous embodiments of the invention and the embodiments thereof are the subject matter of the dependent claims.

In the method according to the invention for determining a vehicle body movement of a vehicle body of a vehicle, camera images of the vehicle surroundings are continuously recorded by means of a camera arranged on the vehicle. Image position data of at least one static object are determined in camera images recorded at different times and the vehicle body movement is determined using the time sequence of the determined image position data.

Image position data of an object are thereby understood to be data which describe a position of an image of the object or positions of images of parts of the object within a camera image.

The method according to the invention thus provides to determine the vehicle body movement through an evaluation of camera images which are recorded by a camera arranged on the vehicle. Other sensors such as spring path sensors are thereby superfluous whereby these are normally used to determine a vehicle body movement. This advantageously facilitates a component reduction and thus costs saving in the fitting-out of vehicles which are to have means for determining the vehicle body movement and in addition a camera also suited for other purposes. The same camera can for example be used to determine the vehicle body movement and for driver assistance systems, e.g. for driver assistance systems with a camera-based lane recognition or a parking aid. The component reduction simplifies and also reduces the costs of maintenance of such vehicles.

In the method according to the invention for determining a spring compression movement of at least one wheel, mounted in a sprung fashion, of a vehicle, camera images of the vehicle surroundings lying ahead of the vehicle are continuously recorded by means of a camera arranged on the vehicle. In camera images recorded at different times, image position data of at least one static object and lane sections lying ahead of the vehicle are determined. Using the time sequence of the determined image position data a vehicle body movement of a vehicle body of the vehicle and a lane height profile of a lane lying head of the vehicle are determined. The spring compression movement of at least one wheel, mounted in a sprung fashion, of the vehicle is determined from the determined vehicle body movement and the determined lane height profile.

This method has similar advantages to the method according to the invention for determining a vehicle body movement as also in this case the camera can be used, besides for determining the spring compression movement, also for further purposes and no further sensors are required to determine the spring compression movement.

The methods according to the invention can be used in particular advantageously to control vehicle functions such as a damper regulation for shock absorbers, a load recognition or a light width regulation for headlamps of a vehicle, wherein the vehicle body movements and/or spring compression movements determined according to the method are evaluated for controlling the respective vehicle function.

BRIEF DESCRIPTION OF THE DRAWINGS

Further features and details of the invention are described below by reference to exemplary embodiments with the aid of the drawing in which.

DETAILED DESCRIPTION OF THE INVENTION

Figure 1:
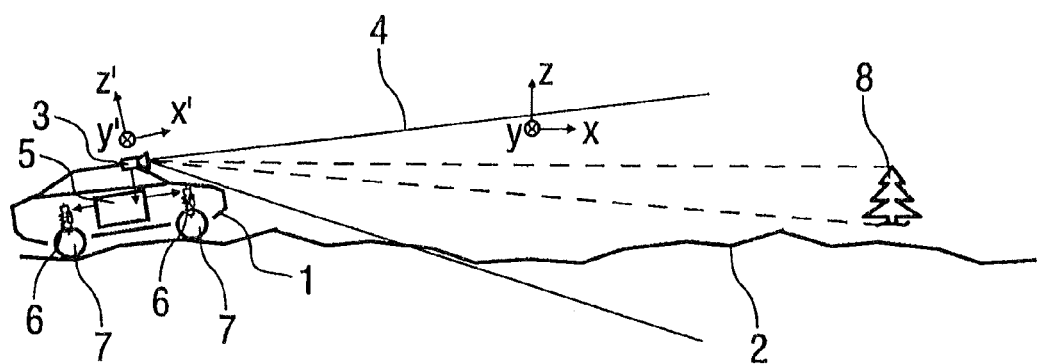
FIG. 1 shows schematically a vehicle with a camera which is orientated to vehicle surroundings lying ahead of the vehicle at a first point in time.

Corresponding parts are provided in all the figures with the same reference numerals.

FIG. 1 shows a vehicle 1 and a lane 2, on which the vehicle 1 moves at a first point in time. On a front region of the body of the vehicle 1 a camera 3 is rigidly arranged, wherein the camera 3 is preferably a stereo camera. By means of the camera 3 camera images of a vehicle environment lying ahead of the vehicle 1 are continuously recorded in a detection region 4 of the camera 3.

The vehicle 1 further comprises a control unit 5 for evaluating the camera images recorded by the camera 3. In particular the control unit 5 evaluates the recorded camera images to determine vehicle body movements of a vehicle body of the vehicle 1 and/or spring compression movements of the wheels 7 of the vehicle 1 and for example for generating control signals for damper regulation of shock absorbers 6 for wheels 7 of the vehicle 1.

Figure 2:
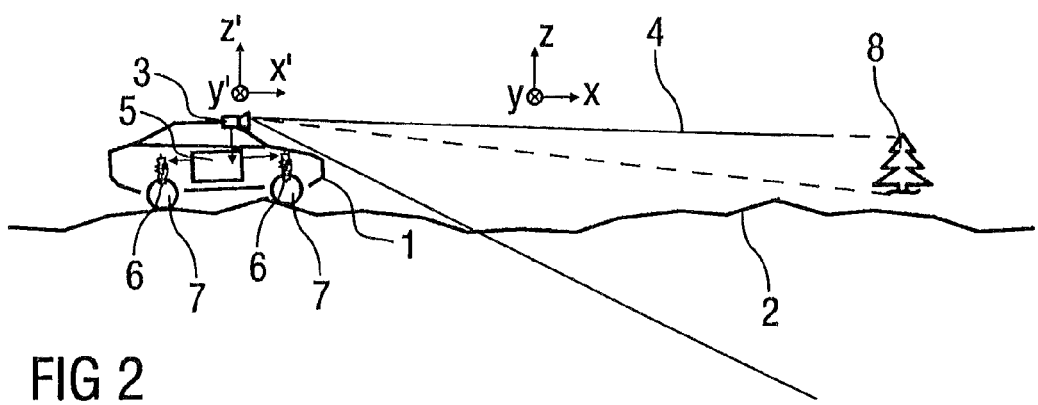
FIG. 2 shows schematically the vehicle shown in FIG. 1 at a second point in time.

FIG. 2 shows the vehicle shown in FIG. 1 at a second, later point in time, at which it has moved forwards having regard to the situation on the lane 2 shown in FIG. 1.

The camera images recorded by the camera 3 are fed to the control unit 5 and evaluated by it to determine vehicle body movements of a vehicle body of the vehicle 1 and/or spring compression movements of the wheels 7 of the vehicle 1.

In this connection at least one static, i.e. non-moving, object 8 and lane sections are identified by means of the control unit 5 in the camera images in the detection region 4 of the camera 3 through known object recognition methods and image position data of the object 8 and the lane sections are determined. The movement of the camera 3 relative to the object 8 and the lane sections is determined from image position data which are determined in camera images recorded at different adjacent points in time.

For example the object 8 is in the situation shown in FIG. 1 of the first point in time is in a middle part of the detection region 4 of the camera 3 while in the situation of the second point in time shown in FIG. 2 it is in an upper part of the detection region 4. The object 8 thus appears in a camera image recorded at the first point in time in a middle image region and in a camera image recorded at the second point in time in an upper image region. A change in direction, in which the object 8 is located having regard to a camera-fixed reference system in which the camera 3 is held, can be determined from the time-based change of the image region, in which the object 8 appears in the camera images. The camera-fixed reference system is indicated in FIGS. 1 and 2 by Cartesian coordinate axes x', y', z'.

As the camera 3 is fixedly connected to the body of the vehicle 1 the camera-fixed reference system is also a rest system of the vehicle body, i.e. a reference system in which the vehicle body rests. The time-based change of the tilt of the camera-fixed reference system and thus of the vehicle body can thus be determined in a rest system of the object 8 and the lane 2 from the evaluation of the camera images which has just been described. The rest system of the object 8 and the lane 2 are shown in FIGS. 1 and 2 by Cartesian coordinate axes x, y, z. The evaluation of the camera images thus allows the determination of the vehicle body movement, i.e. in particular the time-related course of a pitch angle and/or a roll angle of the vehicle body and the corresponding angle speeds and/or accelerations.

The use of a camera 3 configured as a stereo camera advantageously allows a more precise determination of the vehicle body movement and through known stereoscopic evaluation methods of the camera images also the determination of the distance of the camera 3 from the object 8 and its time-based change and thus in particular also a relative speed of the camera 3 and the object 8.

By additionally correspondingly evaluating image position data of lane sections in the detection region 4 a lane height profile is also determined. Spring compression movements of the wheels 7 of the vehicle 1 are determined from determined lane height profile and the determined vehicle body movements. In this connection for example movement trajectories of points of the vehicle body over the wheels 7 are determined from the determined vehicle body movements and a time-based course of the travelling speed and are compared with the determined lane height profile.

The determined data of the vehicle body and spring compression movements are used in the manner known from the prior art in order to generate control signals for damper regulation of shock absorbers 6 of wheels 7 of the vehicle 1 by means of the control unit 5.

The data determined of the vehicle body movements can also advantageously be used for dynamic light width regulation of headlamps of the vehicle 1, for example in order to keep the light width of the headlamps constant during braking and accelerating processes. The methods already known from the prior art for light width regulation can also be used for this application, whereby data of vehicle body movement are used, but whereby according to the invention no spring path sensors are required to determine these data.

A further advantageous application of the determined data of vehicle body and/or spring compression movements is the use thereof to recognise a load of the vehicle 1, for example through an evaluation of the determined data using stored data concerning vehicle body movements and/or spring compression movements in the unloaded state of the vehicle in dependence upon a lane height profile.

An advantageous embodiment of the invention further provides to project, by means of a suitable projection device arranged on the vehicle 1, in case of poor visibility conditions, a grid of light beams which can be detected by the camera 3 and is invisible to the human eye as necessary into the detection region 4. The methods according to the invention can thus also be used in poor visibility conditions, for example at night.

LIST OF REFERENCE NUMERALS

1 Vehicle
2 Lane
3 Camera
4 Detection region
5 Control unit
6 Shock absorbers
7 Wheel
8 Object
x', y', z' Cartesian coordinate system of a camera-fixed reference system
x, y, z Cartesian coordinate system of a rest system of the object

The invention claimed is:

1. A method for determining a vehicle body movement of a vehicle body of a vehicle (1) having a camera (3) arranged on the vehicle (1), comprising
   continually recording camera images of vehicle surroundings by means of the camera (3),
   determining, by a processor, image position data of at least one static object (8) in camera images recorded at different times, and
   determining, by the processor, the time-related course of at least one of a pitch angle and a roll angle of the vehicle body as vehicle body movement using the time-based sequence of detected image position data.

2. A method for control of a function of a vehicle (1) having a camera (3) arranged on the vehicle (1), comprising
   continually recording camera images of vehicle surroundings by means of the camera (3),
   determining, by a processor, image position data of at least one static object (8) in camera images recorded at different times,
   determining, by a processor, image position data of lane sections in the detection region (4) to determine a lane height profile, determining, by the processor, the spring compression movement of the wheels (7) of the vehicle (1) using the time-based sequence of detected image position data, and generating a control signal for controlling a function of the vehicle based on the determined spring compression movement, wherein the function is selected from damper regulation of the shock absorbers (6) for the wheels (7) of the vehicle (1), regulating suspension based on load recognition, and regulating light width for the headlamps of the vehicle.

3. A method for determining a spring compression movement of at least one wheel (7), mounted in a sprung fashion, of a vehicle (1) which has a camera (3) arranged on the vehicle (1), the method comprising continually recording camera images of vehicle surroundings lying ahead of the vehicle (1) by means of the camera (3) camera, determining, by a processor, image position data of at least one static object (8) and lane sections lying ahead of the vehicle (1) in camera images recorded at different times, determining, by the processor, by reference to the time-based sequence of the determined image position data, a vehicle body movement of a vehicle body of the vehicle (1) and a vehicle height profile of a lane (2) lying ahead of the vehicle, and determining, by the processor, the spring compression movement of at least one wheel (7), mounted in a sprung fashion, of the vehicle (1) from the determined vehicle body movement and the determined lane height profile.

4. A method according to claim 3 to control a vehicle function of a vehicle (1), wherein the determined vehicle body movement and/or the determined spring compression movement are evaluated to control the vehicle function.

5. The method according to claim 4, wherein the vehicle function is a damper regulation for shock absorbers (6) or a load recognition or a light width regulation for headlamps of the vehicle (1).

* * * * *